United States Patent
Sasaki et al.

[19]

[11] Patent Number: 5,850,499
[45] Date of Patent: Dec. 15, 1998

[54] LOCKING CLOSURE FOR OPTICAL FIBER CABLE CONNECTION

[75] Inventors: Daijiro Sasaki, Tokyo; Kinji Mineshima, Saitama; Yasunari Tsuruta; Tadashi Hattori, both of Tokyo; Yoshiyuki Yoshii, Chiba; Mitsuo Kama, Ibaragi; Tetsuya Hoshijima; Toshiyuki Ishikawa, both of Ibaragi, all of Japan

[73] Assignees: Japan Recom Ltd.; Nippon Telegraph and Telephone Corporation, Japan

[21] Appl. No.: 843,123

[22] Filed: Apr. 25, 1997

[30] Foreign Application Priority Data

Oct. 16, 1996 [JP] Japan ................................. 8-293188

[51] Int. Cl.$^6$ ................................................. G02B 6/00
[52] U.S. Cl. .......................... 385/135; 385/134; 385/136; 385/137
[58] Field of Search ..................... 385/134, 135, 385/136, 137, 138, 100, 76, 77, 87

[56] References Cited

U.S. PATENT DOCUMENTS

| | | |
|---|---|---|
| 4,548,465 | 10/1985 | White ............................... 385/136 X |
| 4,898,542 | 2/1990 | Jones, Jr. ............................. 439/371 |
| 5,214,735 | 5/1993 | Henneberger et al. ................ 388/136 |
| 5,280,556 | 1/1994 | Jones .................................. 385/139 |
| 5,440,666 | 8/1995 | Burek et al. ......................... 385/135 |
| 5,446,823 | 8/1995 | Bingham et al. .................... 385/135 |
| 5,568,584 | 10/1996 | Smith ................................. 385/135 |
| 5,598,500 | 1/1997 | Crespel et al. ...................... 385/139 |
| 5,638,474 | 6/1997 | Lampert et al. ..................... 385/78 |
| 5,677,975 | 10/1997 | Burek et al. ......................... 385/136 |

*Primary Examiner*—Brian Healy
*Attorney, Agent, or Firm*—Lerner, David, Littenberg, Krumholz & Mentlik

[57] ABSTRACT

A closure for cable connection capable of positively maintaining fastening between joint edges of a sleeve, exhibiting increased safety and airtightness, and substantially improving workability in assembling thereof. A sleeve is formed so as to be split into two parts in an axial direction thereof. The two parts of the sleeve are connected on one side thereof to each other by means of hinge sections and formed on the other side thereof with joint edges. One of the joint edges is mounted thereon with fasteners each provided with a holding hole and the other joint edge is provided with holding projections each releasably engaged with a corresponding one of the holding holes. Each fastener and the sleeve are provided with a holding hole and an additional holding projection for locking the fastener to the sleeve in a manner to be opposite to each other, respectively.

21 Claims, 8 Drawing Sheets

LOCKING CLOSURE FOR OPTICAL FIBER CABLE CONNECTION

BACKGROUND OF THE INVENTION

This invention relates to a closure for protection of a connection section or splicing section of a communication cable such as an optical fiber cable or the like, and more particularly to an improvement in a cable closure for an optical fiber cable.

In general, a closure for cable connection includes end plates through which cables with a cable connection section being interposedly formed therebetween are inserted and a cylindrical sleeve formed of split parts so as to cover the cable connection section. The two parts for the sleeve arranged between the end plates are joined to each other through abutting portions thereof opposite to each other using any suitable fixing means such as mounting screws, resulting in the sleeve for airtightly or watertightly protecting the cable connection section being provided.

The thus-constructed cable closure which acts as a cable connection receiving structure for protecting the cable connection section is required to exhibit rigidity sufficient to prevent deformation of the sleeve and properties sufficient to prevent intrusion of moisture thereinto. For this purpose, it is required that the cable closure is constructed so as to permit components of the sleeve to be intimately or tightly coupled to each other and coupling between the cable and the sleeve to be likewise tightly carried out. Alternatively, the conventional cable closure is often provided with an airtight seal member for the same purpose. Unfortunately, this renders manufacturing of the closure troublesome and costly and deteriorates durability of the closure. Further, in order to ensure that the sleeve exhibits satisfactory airtightness, force for fastening the end plates must be strictly controlled and assembling and disassembling of the closure are caused to be laborious and time-consuming.

SUMMARY OF THE INVENTION

The present invention has been made in view of the foregoing disadvantages of the prior art.

Accordingly, it is an object of the present invention to provide a closure for cable connection which is capable of preventing deformation of a structure for receiving a cable connection section.

It is another object of the present invention to provide a closure for cable connection which is capable of satisfactorily exhibiting both safety and airtightness.

It is a further object of the present invention to provide a closure for cable connection which is capable of substantially increasing workability in assembling of the closure.

It is still another object of the present invention to provide a closure for cable connection which is capable of being significantly simplified in construction and reduced in manufacturing cost.

In accordance with the present invention, a closure for cable connection is provided. The closure generally includes a sleeve of a cylindrical shape into which a cable is introduced, a cable clamp arranged in the sleeve for fixing the cable, and at least one fiber cable storage casing arranged in the sleeve for receiving therein a fiber connection section of each of cable fibers led out of the cable fixed by the cable clamp and an excessive fiber extending from the fiber connection section. The sleeve is formed so as to be split into two halves or parts in an axial direction thereof. The two parts of the sleeve are connected on one side thereof to each other by means of a hinge section and formed on the other side thereof with joint edges. One of the joint edges is mounted thereon with at least one fastener provided with a holding section and the other of the joint edges is provided with at least one held section releasably engaged with the holding section. The fastener and the sleeve are provided with mutual fit engagements for locking the fastener to the sleeve, wherein the mutual fit engagements are arranged in a manner to be opposite to each other.

In the closure for cable connection according to the present invention as described above, first the sleeve is kept open at the joint edges, and then a cable or cables and a support wire are inserted through the end plates into the sleeve and connected to a connection mechanism arranged in the sleeve, followed by processing of excessive fibers of the cables. Then, the sleeve is closed and the joint edges are engaged with each other while pressing the two parts of the sleeve against each other. Thereafter, the holding section of each of the fasteners is securely engaged with a corresponding one of the held sections of the sleeve and the mutual fit engagements for locking are fittedly engaged with each other, resulting in double locking being accomplished, so that connection between the joint edges of the sleeve may be positively and safely maintained and increased in reliability. Also, this permits a cable seal material and the end plates to positively exhibit functions thereof and the closure to be increased in sealing characteristics. Release of the sleeve from fastening by the fasteners permits the sleeve to be readily open about the hinges, so that various cable processing operations such as branching of the cables, drawing-in thereof, connection thereof and the like may be facilitated while being visually confirmed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 7A to 7D are vertical sectional views showing the manner of operation of the fastener shown in FIG. 5A, wherein

FIGS. 8A to 8C are vertical sectional views showing the manner of operation of another modification of the fastener of FIG. 4A, wherein

DETAILED DESCRIPTION OF THE PREFERRED EMBODIMENT

Now, a closure for cable connection according to the present invention will be described hereinafter with reference to the accompanying drawings.

Referring first to FIGS. 1 to 4B, an embodiment of a closure for cable connection according to the present invention is illustrated. The closure of the illustrated embodiment generally includes a sleeve 1 provided with end fit sections 2 and end plates 3 each fittedly mounted in a corresponding one of the end fit sections 2. The end plates 3 are each adapted to permit a trunk optical fiber cable (not shown) to be inserted therethrough. The closure of the illustrated embodiment also includes cable clamps 4 for securing the trunk optical fiber cables to the end plates 3, as well as tension member holders 5 to which tension members (not shown) of the cables are connected, respectively. The sleeve 1 is constructed in the form of a cylindrical housing, which may be integrally made of a synthetic resin material such as, for example, PP resin, flame-retardant FRPP resin filled with glass fiber, a thermoplastic elastomer or the like. Also, the sleeve 1 is constructed of two halves or parts defined by splitting the sleeve 1 in an axial or longitudinal direction thereof at one part thereof in a circumferential direction thereof, so that the two parts may be formed with joint edges $1_2$ and $1_3$ through which the parts are joined to each other to constitute the sleeve 1. In the illustrated embodiment, the sleeve 1 is split at a bottom thereof. The sleeve 1 is also formed on an upper end thereof opposite to the joint edges $1_2$ and $1_3$ with two hinge sections $1_1$ and $1_1$ through which the sleeve 1 may be expanded or developed on both sides thereof and closed at the joint edges. The end plates 3 which are fittedly mounted in the respective end fit sections 2 of the sleeve 1 may be made of a plate-like rubber material such as EPDM or the like which is increased in various characteristics such as weather resistance, ozone resistance and the like. The sleeve 1 is so constructed that the joint edges $1_2$ and $1_3$ are integrally joined to each other by simple operation such as press fitting or insertion, to thereby facilitate assembling of the sleeve 1. Also, the sleeve 1 is provided thereon with a plurality of fasteners 10 each of which permits the joint edges $1_2$ and $1_3$ to be releasably locked together by a one-touch operation. Such construction of the sleeve 1 facilitates assembling of the sleeve while eliminating a necessity of arranging any separate bottom plate.

Figure 4A:
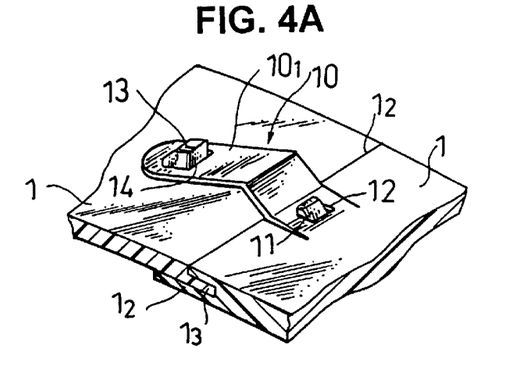
FIG. 4A is a perspective view showing a fastener incorporated in the closure shown in FIG. 1.
Figure 4B:
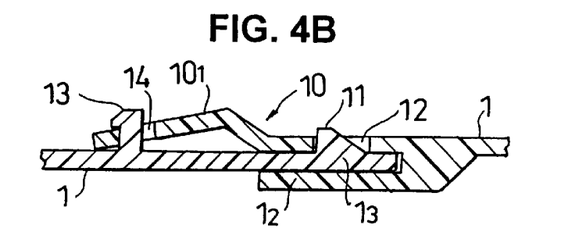
FIG. 4B is an enlarged vertical sectional view of the fastener shown in FIG. 4A.
Figure 5A:
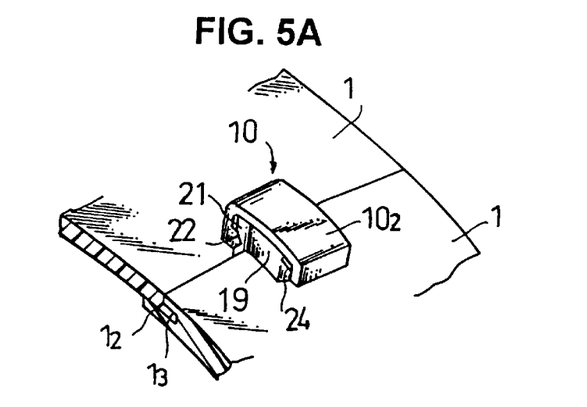
FIG. 5A is a perspective view showing a modification of the fastener shown in FIG. 4A.
Figure 5B:
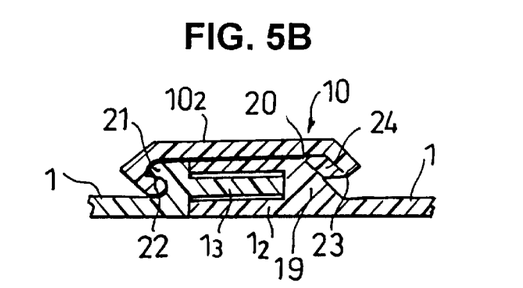
FIG. 5B is an enlarged vertical sectional view of the fastener shown in FIG. 5A.
Figure 6A:
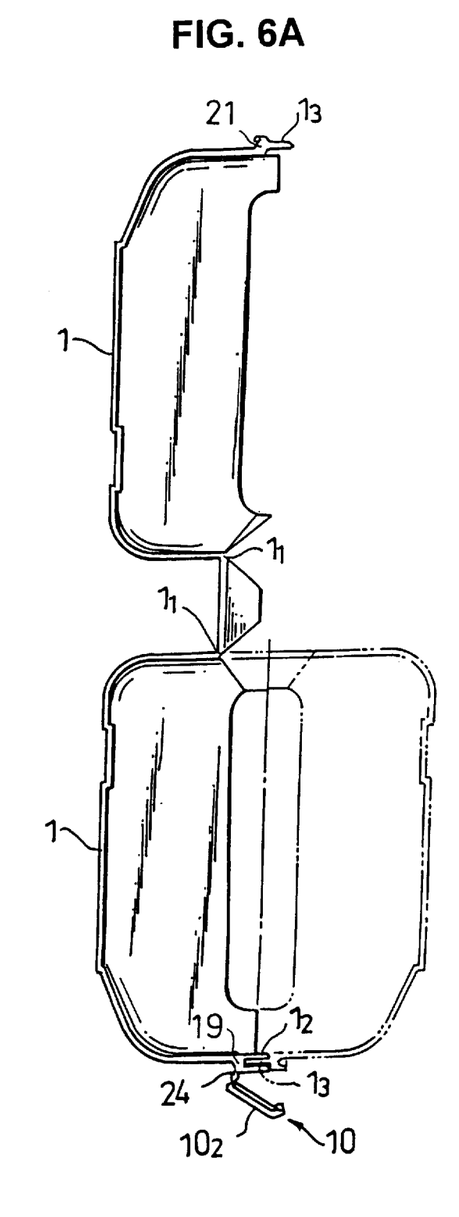
FIG. 6A is a sectional front elevation view showing a sleeve to which the fastener shown in FIG. 5A is applied, which is in the state of being developed.
Figure 6B:
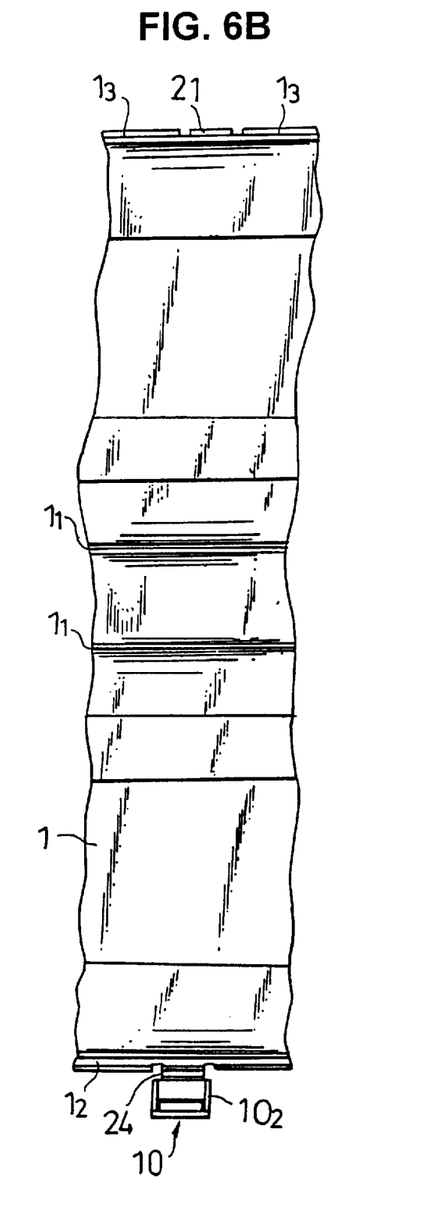
FIG. 6B is a fragmentary side elevation view of the sleeve shown in FIG. 6A.

The fasteners 10, as shown in FIGS. 4A and 4B, are each constructed in the form of a lever integrally made so as to extend from one of the joint edges $1_2$ and $1_3$ of the sleeve 1 or the joint edge $1_2$. The fasteners 10 are each formed with a holding hole 12 fitted on a corresponding one of holding projections 11 provided on the other joint edge 13 of the sleeve 1 and have a tongue-like element $10_1$ arranged so as to extend therefrom and formed with a fit portion or fit hole 14 in which a corresponding one of additional holding projections 13 provided on a portion of an outer periphery of the sleeve 1 in proximity to the joint edge $1_3$ is fitted. In the illustrated embodiment, the additional projection 13 and fit hole 14 cooperate with each other to constitute mutual fit engagements. Thus, it will be noted that the fastener 10 is constructed into a double-lock structure. A suitable number of such fasteners 10 are arranged along the joint edges $1_2$ and $1_3$ in the longitudinal direction of the sleeve 1. In the illustrated embodiment, three such fasteners 10 are provided, wherein one is arranged on a central portion of the sleeve 1 and the remaining two are arranged on the respective ends thereof.

Alternatively, the fasteners 10 may each be constructed in such a manner as shown in FIGS. 5A to 8C, wherein FIGS. 5A to 7D show a modification of the fastener 10 shown in FIG. 4A and FIGS. 8A to 8C show another modification thereof.

A fastener 10 shown in FIGS. 5A to 7D is constructed in the form of an integrally-made lever, which includes a first hinge 20 connected to a corresponding one of first holding projections 19 formed on the one joint edge $1_2$ of the sleeve 1. The fastener 10 may include a top lever section $10_2$ which is provided with a holding recess 22 in which a corresponding one of second holding projections 21 provided on the portion of the outer peripheral surface of the sleeve 1 in proximity to the other joint edge $1_3$ is fitted and has a connection element 24 bendably connected thereto through a second hinge 23 while being interposedly arranged between the hinges 20 and 23. In the modification, the projections 19 and 21 and the recess 22 cooperate with each other to constitute mutual fit engagements.

Figure 7A:
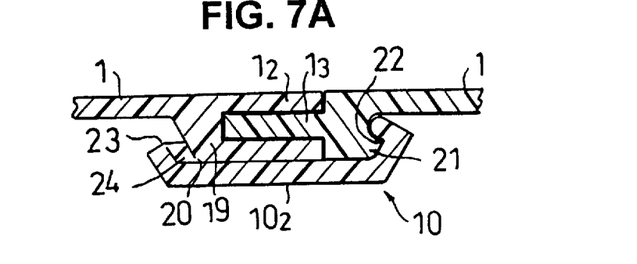
FIG. 7A shows fastening of the sleeve by the fastener.
Figure 7B:
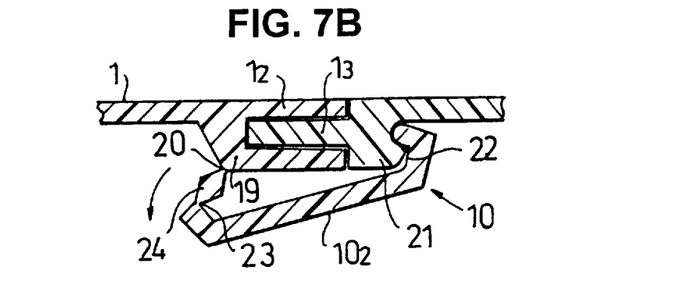
FIG. 7B shows release of one side of the fastener from the sleeve.
Figure 7C:
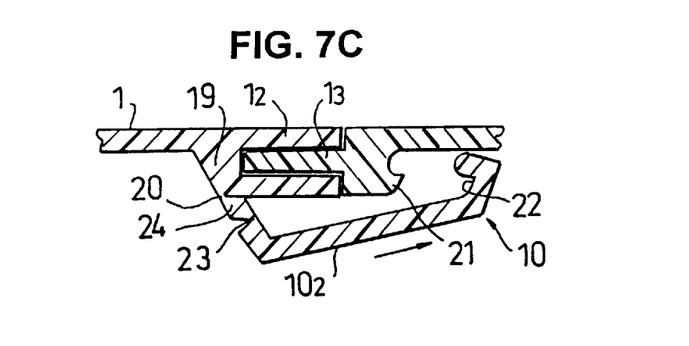
FIG. 7C shows release of the other side of the fastener from the sleeve.
Figure 7D:
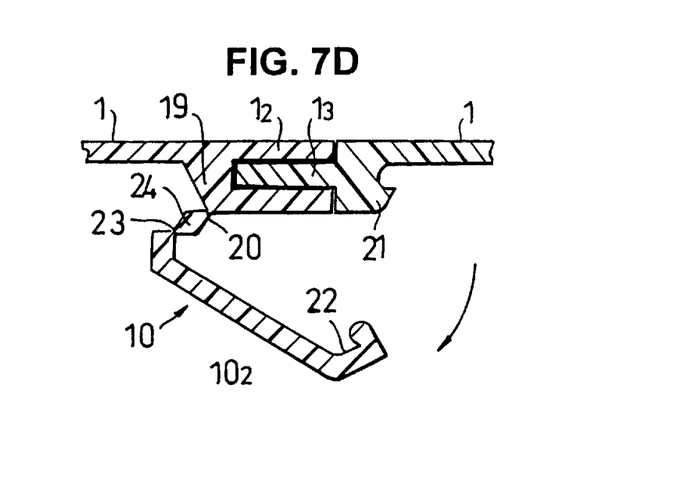
FIG. 7D shows full release of the fastener from the sleeve.

The fastener 10 of the modification may be operated in such a manner as shown in FIGS. 7A to 7D. More particularly, in FIG. 7A, the joint edges $1_2$ and $1_3$ of the sleeve 1 are kept locked together by the fastener 10. Separation or release of the joint edges $1_2$ and $1_3$ of the sleeve 1 from each other is carried out by raising a portion of the fastener 10 on a side of the connection element 24 interposed between the hinges 20 and 23 from the projection 19 as shown in FIG. 7B, moving the top lever section $10_2$ in a direction as indicated by an arrow to release the holding recess 22 from the holding projection 21 as shown in FIG. 7C and then raising the top lever section $10_2$ as shown in FIG. 7D. Locking between the joint edges $1_2$ and $1_3$ is executed by merely fittedly engaging the holding recess 22 of the top lever section $10_2$ with the holding projection 21 and pressing the fastener 10 onto the holding projections 19 and 21. Load applied to the fastener 10 during locking is borne by the top lever section $10_2$, resulting in an area on which the load is borne being increased, so that the fastener 10 may exhibit satisfactory reliability over a long period of time.

Figure 8A:
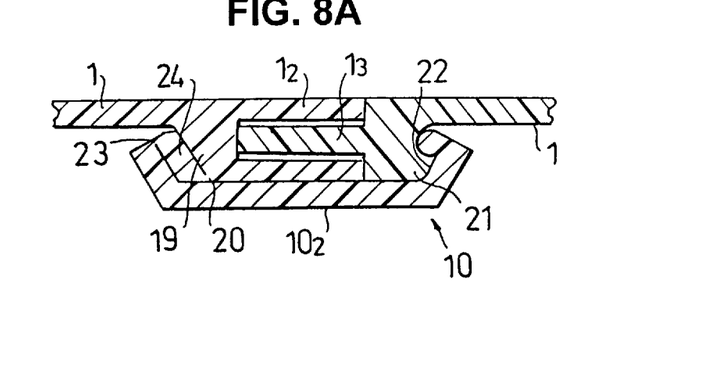
FIG. 8A shows fastening of the sleeve by the fastener.
Figure 8B:
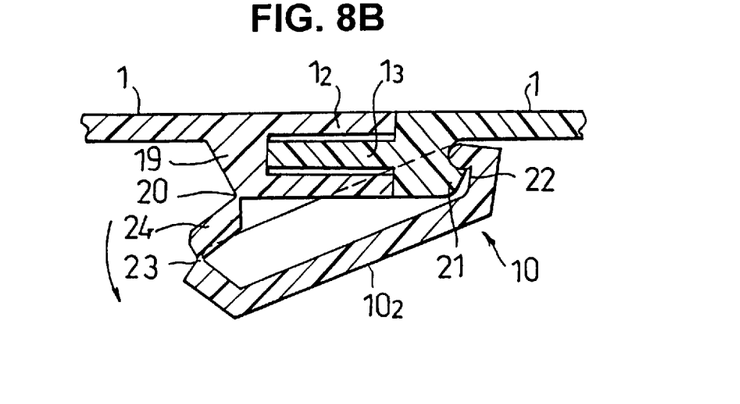
FIG. 8B shows release of one side of the fastener from the sleeve.
Figure 8C:
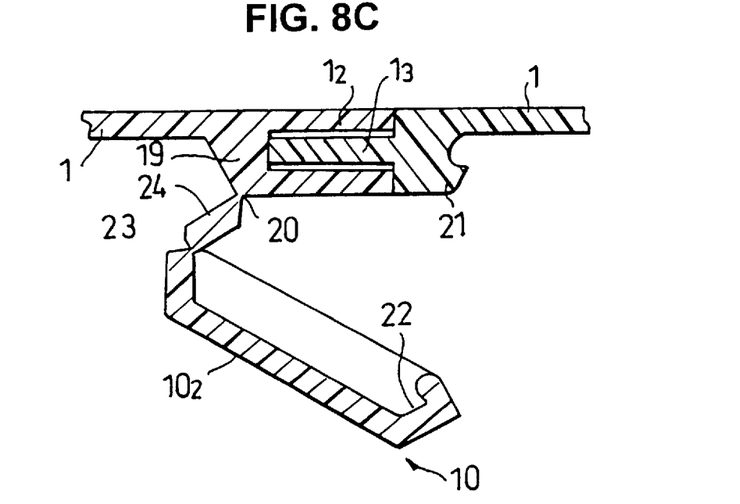
FIG. 8C shows full release of the fastener from the sleeve.

A fastener 10 shown in FIGS. 8A to 8C is so constructed that a connection element 24 connected through a second hinge 23 to a top lever section $10_2$ and interposedly arranged between the second hinge 23 and a first hinge 20 is increased in length, to thereby improve moldability of the fastener 10. Such construction also permits operation of holding the connection element 24 on the holding projection 19 to be carried out with a reduced force.

In each of the modifications described above, the fasteners 10 are preferably constructed so as to engagedly cover the respective holding projections 19 and 21 provided on the joint edges $1_2$ and $1_3$ of the sleeve 1 or the outer peripheral surface of the sleeve 1 in a manner to be spaced from one another at intervals in the axial direction of the sleeve 1 and fit the holding recesses 22 on the respective holding projections 19 and 21 opposite to each other.

Figure 1:
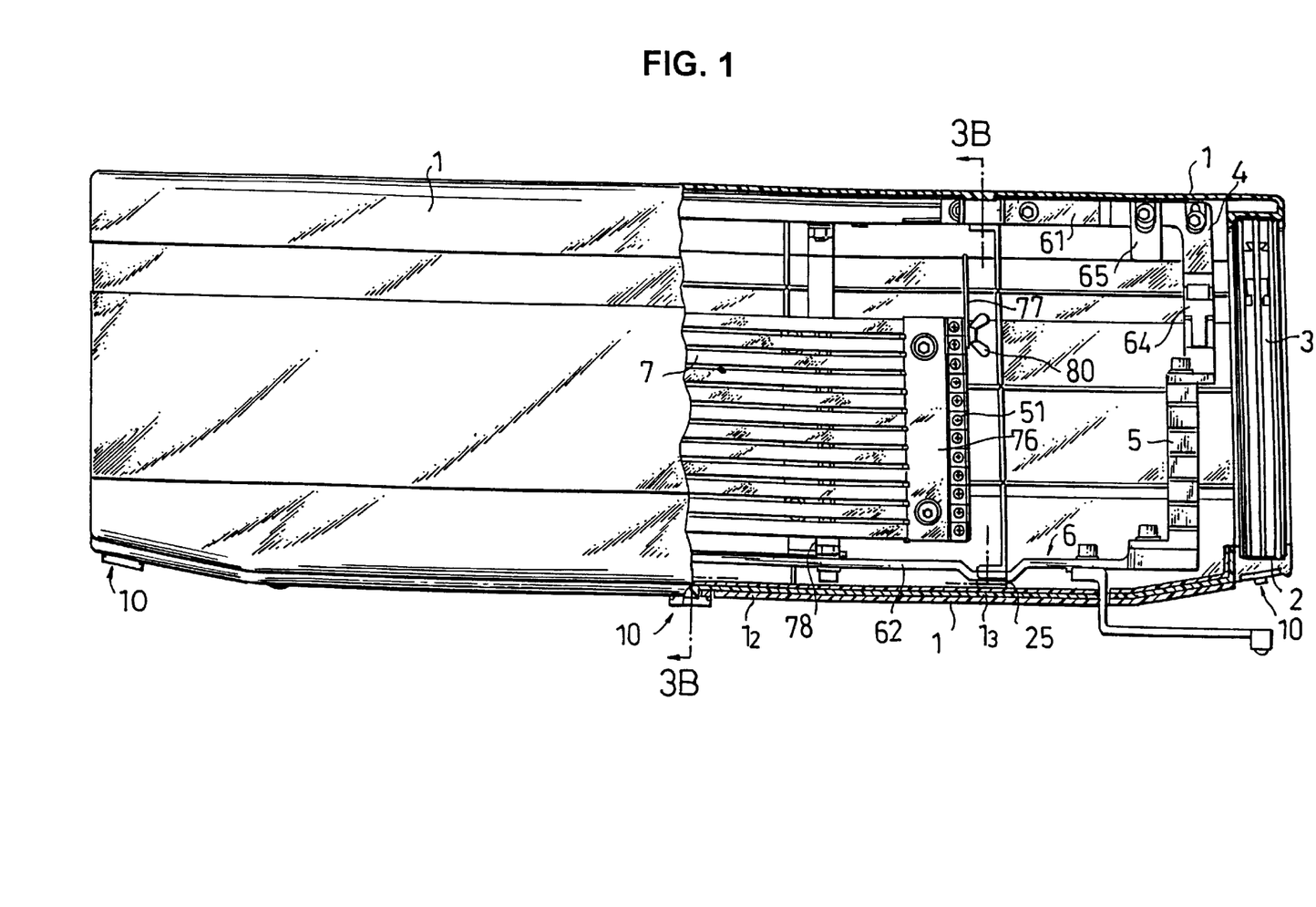
FIG. 1 is a side elevational view, partly in section, showing an embodiment of a closure for cable connection according to the present invention.
Figure 2:
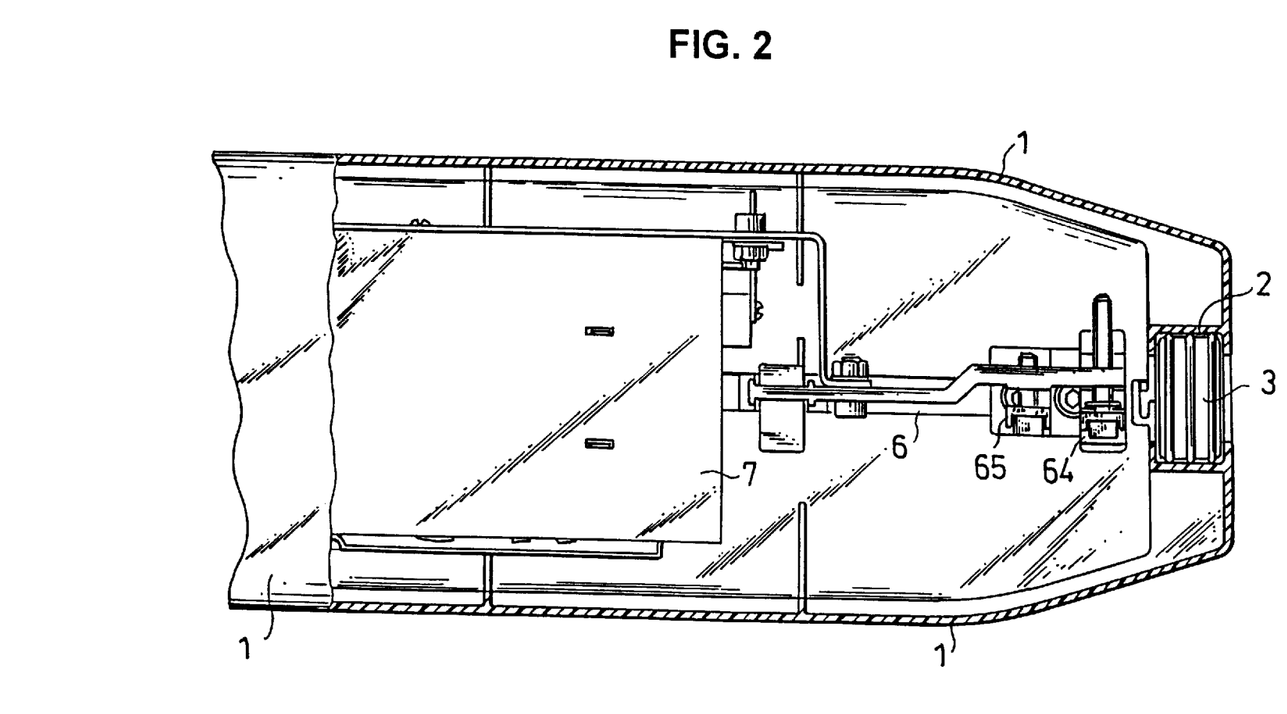
FIG. 2 is a fragmentary plan view in section of the closure shown in FIG. 1.
Figure 3A:
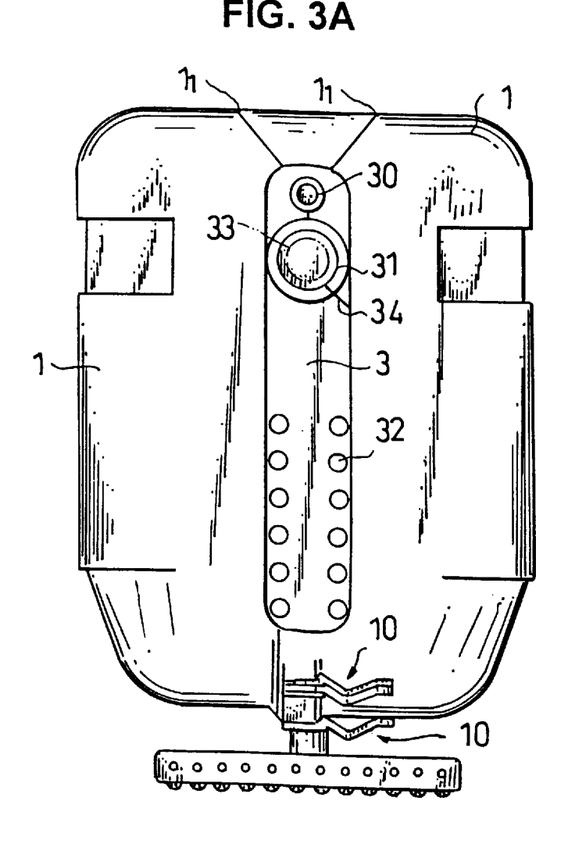
FIG. 3A is a front elevation view of the closure shown in FIG. 1, which is in the state of being assembled.
Figure 3B:
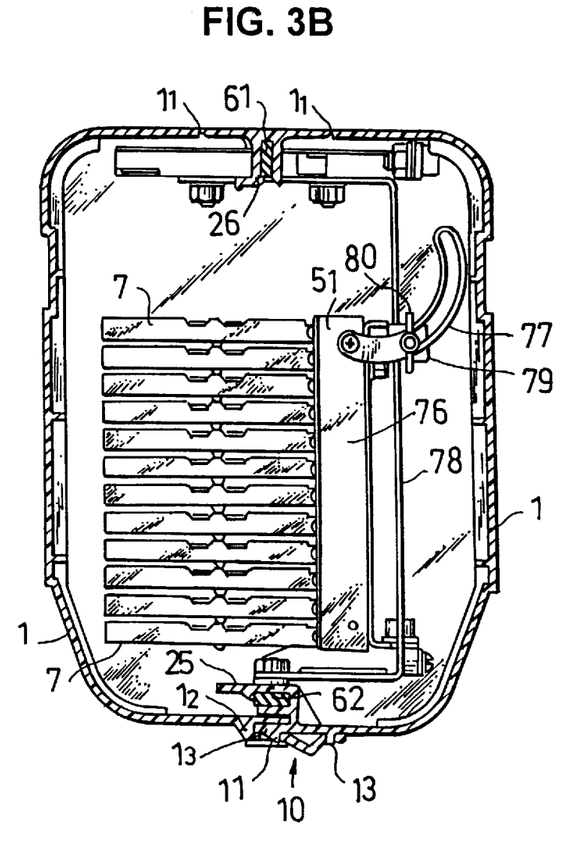
FIG. 3B is a sectional front elevation view taken along line 3B—3B of FIG. 1.

Also, the joint edge $1_2$, as shown in FIGS. 1 and 3B, is provided on an inner surface thereof with a plurality of connection fitment mounting sections 25, which are arranged in a manner to be spaced from each other between the fasteners 10 spacedly provided on the outer periphery of the sleeve 1, so that joining between the joint edges $1_2$ and $1_3$ may be stabilized.

The end plates 3 which may be made of EPDM are each provided with a support wire insertion hole 30 and a cable insertion hole 31 formed with a slit 34 so as to communicate with the hole 31, as well as drop cable insertion holes 32, as shown in FIG. 3A. The cable insertion hole 31 and support wire insertion hole 30 may each have an adapter 33 fitted therein as required, so that access of the cable or wire to the sleeve 1 or the like may be carried out while ensuring sealing between the cable or wire and the sleeve 1. The slit 34 may be formed so as to extend through the end plate 3 to an outer periphery surface of the end plate 3.

Alternatively, the support wire insertion hole 30 and cable insertion hole 31 may each have a rubber spacer arranged therein to ensure sealed contact between the insertion hole and the cable or wire. Also, in place of arrangement of the spacer, a seal tape or airtight tape made of an elastic material having hardness of 0 may be wound around the cable or wire so as to be tightly in contact with a corresponding one of the insertion holes 30 and 31 for the same purpose.

The closure of the illustrated embodiment further includes a plurality of fiber cable storage casings 7 arranged in the sleeve 1 while being stacked on each other. The fiber cable storage casings 7 are each provided therein with a connector holder for receiving each of connection sections or splicing sections between optical fibers of the fiber cables therein and an excessive fiber receiver for an excessive fiber of each of the cable fibers. The connector holder is constructed so as to heldly receive therein a connector for connection between the optical fibers such as, for example, a mechanical splice connector or a subunit or cassette having a plurality of connectors put therein. The excessive fiber receiver is adapted to receive therein each excessive fiber led out of the connector held in the connector holder while drawing the excessive fibers around therein.

The fiber cable storage casings 7 may each be formed of synthetic resin with a substantially square shape, a rectangular shape or an elliptic shape by injection molding. The excessive fiber receiver is constructed so as to permit the excessive fiber to be wound in a loop-like manner therein while being smoothly curved, to thereby prevent fiber holding elements arranged at predetermined intervals therein from adversely affecting transmission characteristics of the fiber.

Figure 9:
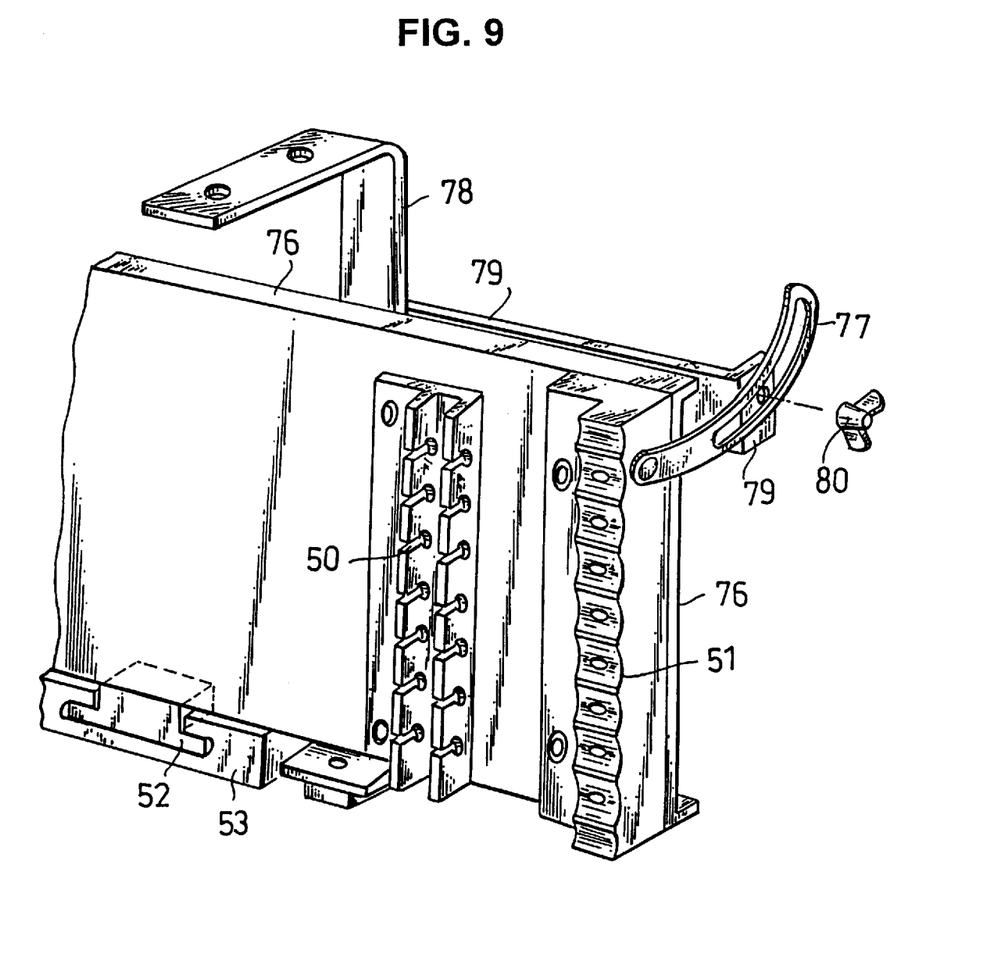
FIG. 9 is a fragmentary perspective view showing a mounting section of a fiber cable storage casing incorporated in the closure shown in FIG. 1.

Also, the fiber cable storage casings 7 are constructed so as to be detachably held on a tray mounting stand base plate 76 through a tray fixing section 50 (FIGS. 1 and 9) by a one-touch operation. The stand base plate 76 is arranged so as to be guided by a slide stay 77, so that the fiber cable storage casing 7 is moved out of the sleeve 1. This structure results in the fiber cable storage casings 7 being displaced to any position which permits a fiber connection operation to be facilitated. The stand base 76 is held by means of a fixing bracket 78 while the fiber cable storage housings 7 are received in the sleeve 1.

The base plate 76 is mounted thereon with a tension member fixing section 51 as well as the above-described tray fixing section 50 for the fiber cable storage casings 7. The base plate 76 is slidably mounted on a slide base 53 through a slide block 52. Also, the base plate 76 is movably connected to a slide stay receiver 79 by means of the slide stay 77 and selectively fixed on the slide stay receiver 79 by means of a screw 80. Such construction permits inspection of the fiber cable storage casing 7 and various operations to be facilitated in the sleeve 1.

The fixing bracket 78, as shown in FIG. 1, is vertically secured to a connection fitment 6 fixed in the sleeve 1. The connection fitment 6 is provided by integrally forming each of the cable clamps 4 and each of the tension member holders 5 on an upper connection 61 and a lower connection 62. The upper connection 61 includes a mounting section for a clamp arm 64 and a support wire clamp section 65 and the lower connection 62 includes a mounting section for the fixing bracket 78. The upper and lower connections 61 and 62 thus constructed are adapted to be detachably fixedly secured to connection fitment mounting sections 25 and 26 projectedly provided on upper and lower portion of an inner surface of the sleeve 1 by a one-touch operation.

The cable clamp 4 is so constructed that a curved holding element 64 arranged in conformity to an outer periphery of the cable is pivotally mounted on a receiving section provided with a cable insertion recess by means of a pin so as to open and close, to thereby interposedly fix the cable by means of screws, resulting in facilitating clamping of the cable. The curved holding element 64 may be constructed so as to be detachable with respect to the receiving section.

The sleeve 1 is integrally formed while being provided with developability and cooperates with the end plates 3 to define an airtight space therein. Alternatively, the sleeve 1 may be so constructed that the two parts of the sleeve 1 arranged so as to be splittable in the axial direction thereof are integrally connected to each other through joint surfaces thereof opposite to each other. For example, the sleeve 1 may be so constructed that one side of the sleeve defined in the longitudinal direction thereof is fixed or detachably connected through a hinge and the other side thereof is provided with buckles for fastening and tightening of the sleeve. Also, the sleeve 1 may have a band detachably wound on an outer surface thereof to further enhance sealing between the joint edges $1_2$ and $1_3$, as required.

Further, it is preferable that the end plates 3 be made of an elastic rubber material of an elliptic shape, a circular shape or the like and formed with a plurality of cable insertion holes each provided with a thin-wall cap so that selective removal of the cap permits the cable insertion hole to be open, resulting in an outside of the end plate and an inside thereof communicating with each other therethrough.

Now, the manner of assembling of the closure of the illustrated embodiment thus constructed will be described.

First, the cables are each fitted thereon with the adapter 33. Alternatively, a cable seal material is wound on each of the cables. Then, a jacket of an end of each of the cables is fixed by the cable clamp 4. Then, the joint edges $1_2$ and $1_3$ of the sleeve 1 are abutted against each other while arranging a seal material on a joint surface of each of the end plates 3 and the fasteners 10 at the joint edges $1_2$ and $1_3$ are fastened. This permits the sleeve 1 to be provided with satisfactory and reliable airtightness over a whole length thereof.

Under such assembling conditions, a sleeve gasket may be arranged between the joint edges $1_2$ and $1_3$ as required, so that the sleeve may be provided with increased airtightness while keeping clamping force which is applied to the sleeve considerably reduced. Also, arrangement of a seal member such as a spacer or the like between the cable and each of the end plates 3 further enhances airtightness of the sleeve 1.

Release of the sleeve 1 from fastening by the fasteners 10 is carried out by releasing the joint edges $1_2$ and $1_3$ of the sleeve 1 from one-touch locking by each fastener 10 to separate them from each other, resulting in exposing each of the fiber cable storage casings 7, so that replacement of the cables may be facilitated.

As can be seen from the foregoing, the closure for cable connection according to the present invention permits the joint edges of the sleeve to be readily locked together while being kept abutted against each other, to thereby accomplish rapid covering and receiving of the cable connection section by the sleeve. Also, the closure of the present invention leads to uniform tightening of the sleeve over a whole length of the sleeve while reducing the number of positions at which fastening of the sleeve is carried out, to thereby ensure reliable sealing of the sleeve. Further, the closure of the present invention exhibits a double-locking function sufficient to keep the sleeve positively and reliably fastened and render a posture of the sleeve stable. Moreover, the closure of the present invention facilitates assembling of the closure and accomplishes connection and fixing of the cables with ease and safety. Furthermore, the present invention permits the cable connection section to be simplified in structure and reduced in manufacturing cost.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A closure for cable connection comprising:
    a sleeve of a cylindrical shape into which a cable is introduced;
    a cable clamp arranged in said sle?eve for fixing the cable; and
    at least one fiber cable storage casing arranged in said sleeve for receiving therein a fiber connection section of each of cable fibers led out of the cable fixed by said cable clamp and an excessive fiber extending from the fiber connection section;
    said sleeve being formed so as to be split into two parts in an axial direction thereof, said two parts of said sleeve being connected on one side thereof to each other by means of a hinge section and formed on the other side thereof with joint edges;
    one of said joint edges being mounted thereon with at least one fastener provided with a holding section and the other of said joint edges being provided with at least one held section releasably engaged with said holding section;
    said fastener and said sleeve being provided with mutual fit engagements for locking said fastener to said sleeve, said mutual fit engagements being arranged in a manner to be opposite to each other.

2. A closure for cable connection as defined in claim 1, wherein said fastener comprises a lever integrally formed so as to extend from said one joint edge and said holding section comprises a recess or a hole; and
    said held section comprises a projection provided on a portion of an outer peripheral surface of said sleeve in proximity to the other joint edge and adapted to be fitted in said recess or hole.

3. A closure for cable connection as defined in claim 1, wherein one of said mutual fit engagements which is arranged on said sleeve comprises a holding projection provided on the outer peripheral surface of said sleeve;
    said fastener includes an elongated bendable tongue-like element; and
    the other of said mutual fit engagements which is arranged on said fastener comprises a fit hole provided on said tongue-like element so as to be fitted on said holding projection.

4. A closure for cable connection as defined in claim 2, wherein one of said mutual fit engagements which is arranged on said sleeve comprises a holding projection provided on the outer peripheral surface of said sleeve;
    said fastener includes an elongated bendable tongue-like element; and
    the other of said mutual fit engagements which is arranged on said fastener comprises a fit hole provided on said tongue-like element so as to be fitted on said holding projection.

5. A closure for cable connection as defined in claim 1, wherein said fastener comprises a lever integrally formed and connected through a first hinge to said one joint edge and formed therein with a holding recess serving as said holding section, said first hinge having a connection element connected thereto, said connection element being interposedly connected between said first hinge and a second hinge so as to be bendable at said first and second hinges; and
    said held section comprises a holding projection provided on a portion of an outer peripheral surface of said sleeve in proximity to the other joint edge and adapted to be fitted in said holding recess.

6. A closure for cable connection as defined in claim 5, wherein said one joint edge is provided with an additional holding projection in a manner to be opposite to said holding projection; and
    said fastener includes a top lever section provided with said holding recess for engagedly covering said holding projection and said additional holding projection.

7. A closure for cable connection as defined in claim 1, wherein a plurality of the fasteners and held sections are arranged so as to be spaced from each other in the axial direction of said sleeve, respectively.

8. A closure for cable connection as defined in claim 2, wherein a plurality of the fasteners and held sections are arranged so as to be spaced from each other in the axial direction of said sleeve, respectively.

9. A closure for cable connection as defined in claim 3, wherein a plurality of the fasteners and held sections are arranged so as to be spaced from each other in the axial direction of said sleeve, respectively.

10. A closure for cable connection as defined in claim 6, wherein a plurality of the fasteners arid a plurality of the holding projections and additional holding projections are arranged so as to be spaced from each other in the axial direction of said sleeve, respectively.

11. A closure for cable connection as defined in claim 7, further comprising a connection fitment arranged in said sleeve for mounting said cable clamp and fiber cable storage casing thereon;
    the other joint edge of said sleeve being provided on an inside thereof with a plurality of connection fitment mounting sections in a manner to be positioned between said held sections and spaced from each other in the axial direction of said sleeve.

12. A closure for cable connection as defined in claim 9, further comprising a connection fitment arranged in said sleeve for mounting said cable clamp and fiber cable storage casing thereon;

the other joint edge of said sleeve being provided on an inside thereof with a plurality of connection fitment mounting sections in a manner to be positioned between said held sections and spaced from each other in the axial direction of said sleeve.

13. A closure for cable connection as defined in claim 10, further comprising a connection fitment arranged in said sleeve for mounting said cable clamp and fiber cable storage casing thereon;

the other joint edge of said sleeve being provided on an inside thereof with a plurality of connection fitment mounting sections in a manner to be positioned between said held projections and spaced from each other in the axial direction of said sleeve.

14. A closure for cable connection as defined in claim 1, wherein a plurality of the fiber cable storage casings are pivotally and detachably connected to each other in a manner to be stacked on each other and arranged so as to be moved out of said sleeve by means of guide members.

15. A closure for cable connection as defined in claim 2, wherein a plurality of the fiber cable storage casings are pivotally and detachably connected to each other in a manner to be stacked on each other and arranged so as to be moved out of said sleeve by means of guide members.

16. A closure for cable connection as defined in claim 3, wherein a plurality of the fiber cable storage casings are pivotally and detachably connected to each other in a manner to be stacked on each other and arranged so as to be moved out of said sleeve by means of guide members.

17. A closure for cable connection as defined in claim 5, wherein a plurality of the fiber cable storage casings are pivotally and detachably connected to each other in a manner to be stacked on each other and arranged so as to be moved out of said sleeve by means of guide members.

18. A closure for cable connection as defined in claim 1, further comprising end plates arranged on opposite ends of said sleeve and each formed with a cable insertion hole through which the cable is inserted;

said end plates each formed with a slit communicating with said cable insertion hole, said slit being arranged so as to extend through said end plate to an outer periphery surface of said end plate;

the cable being fitted on a portion thereof positioned in said cable insertion hole with an adapter.

19. A closure for cable connection as defined in claim 2, further comprising end plates arranged on opposite ends of said sleeve and each formed with a cable insertion hole through which the cable is inserted;

said end plates each formed with a slit communicating with said cable insertion hole, said slit being arranged so as to extend through said end plate to an outer periphery surface of said end plate;

the cable being fitted on a portion thereof positioned in said cable insertion hole with an adapter.

20. A closure for cable connection as defined in claim 3, further comprising end plates arranged on opposite ends of said sleeve and each formed with a cable insertion hole through which the cable is inserted;

said end plates each formed with a slit communicating with said cable insertion hole, said slit being arranged so as to extend through said end plate to an outer periphery surface of said end plate;

the cable being fitted on a portion thereof positioned in said cable insertion hole with an adapter.

21. A closure for cable connection as defined in claim 5, further comprising end plates arranged on opposite ends of said sleeve and each formed with a cable insertion hole through which the cable is inserted;

said end plates each formed with a slit communicating with said cable insertion hole, said slit being arranged so as to extend through said end plate to an outer periphery surface of said end plate;

the cable being fitted on a portion thereof positioned in said cable insertion hole with an adapter.

* * * * *

UNITED STATES PATENT AND TRADEMARK OFFICE
CERTIFICATE OF CORRECTION

PATENT NO. : 5,850,499
DATED : December 15, 1998
INVENTOR(S) : Sasaki et al.

It is certified that error appears in the above-identified patent and that said Letters Patent is hereby corrected as shown below:

Column 3, line 65, "13" should read --$1_3$--.

Column 7, line 40, "sle?eve" should read --sleeve--.

Signed and Sealed this

Eighteenth Day of May, 1999

Attest:

Q. TODD DICKINSON

*Attesting Officer*   Acting Commissioner of Patents and Trademarks